US010769866B2

(12) United States Patent
Ahn et al.

(10) Patent No.: US 10,769,866 B2
(45) Date of Patent: Sep. 8, 2020

(54) GENERATING ESTIMATES OF FAILURE RISK FOR A VEHICULAR COMPONENT

(71) Applicant: International Business Machines Corporation, Armonk, NY (US)

(72) Inventors: Hyung-il Ahn, San Jose, CA (US); Matthew Denesuk, Ridgefield, CT (US); Axel Hochstein, San Jose, CA (US); Ying Tat Leung, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 14/498,703

(22) Filed: Sep. 26, 2014

(65) Prior Publication Data
US 2016/0093117 A1 Mar. 31, 2016

(51) Int. Cl.
*G01M 17/00* (2006.01)
*G06F 7/00* (2006.01)
(Continued)

(52) U.S. Cl.
CPC .............. *G07C 5/006* (2013.01); *B60K 35/00* (2013.01); *G05B 23/024* (2013.01); *G07C 5/008* (2013.01); *G07C 5/0808* (2013.01)

(58) Field of Classification Search
CPC .................................. G07C 5/006; B60L 1/00
(Continued)

(56) References Cited

U.S. PATENT DOCUMENTS 5,280,223 A   1/1994  Grabowski
5,791,441 A   8/1998  Matos et al.
(Continued)

FOREIGN PATENT DOCUMENTS

CN   103778339 A   5/2014
EP   0126402 A2   11/1984
(Continued)

OTHER PUBLICATIONS ip.com, Method for Visual Life Indication of Flash Based Storage Devices, IPCOM000236342D, Apr. 21, 2014.
(Continued)

*Primary Examiner* — Mahmoud S Ismail
(74) *Attorney, Agent, or Firm* — Ryan, Mason & Lewis, LLP

(57) ABSTRACT

Methods, systems, and computer program products for generating estimates of failure risk for a vehicular component are provided herein. A method includes splitting an input time series pertaining to a vehicular component across a fleet of multiple vehicles into multiple sub-time series, wherein each sub-time series comprises multiple data points of the input time series that correspond to measurements derived from the vehicular component; determining a weight applied to each of the sub-time series based on a pre-determined weight associated with the input time series; applying a failure or non-failure classification label to each of the sub-time series and the input time series; calculating a performance measure for the input time series; determining an updated weight associated with the input time series; and generating an estimate of failure risk for the vehicular component based on the classification label applied to each input time series and the updated weight.

18 Claims, 5 Drawing Sheets

(51) Int. Cl.

| | | |
|---|---|---|
| G06F 11/30 | (2006.01) | |
| G07C 5/00 | (2006.01) | |
| B60K 35/00 | (2006.01) | |
| G05B 23/02 | (2006.01) | |
| G07C 5/08 | (2006.01) | |
| B60L 1/00 | (2006.01) | |
| B60L 3/00 | (2019.01) | |
| H02G 3/00 | (2006.01) | |

(58) Field of Classification Search
USPC .......................................... 701/29.3; 307/10.1
See application file for complete search history.

(56) References Cited

U.S. PATENT DOCUMENTS

| | | |
|---|---|---|
| 6,085,154 A | 7/2000 | Leuthausser et al. |
| 6,330,499 B1 | 12/2001 | Chou et al. |
| 6,424,930 B1 | 7/2002 | Wood |
| 6,484,080 B2 | 11/2002 | Breed |
| 6,748,305 B1 | 6/2004 | Klausner et al. |
| 6,834,256 B2 | 12/2004 | House |
| 7,103,460 B1 | 9/2006 | Breed |
| 7,369,925 B2 | 3/2008 | Morioka et al. |
| 7,383,165 B2 | 6/2008 | Aragones |
| 7,418,321 B2 | 8/2008 | Boutin |
| 7,428,541 B2 | 9/2008 | Houle |
| 7,474,988 B2 | 1/2009 | Kamisuwa et al. |
| 7,489,994 B2 | 2/2009 | Isono et al. |
| 7,567,972 B2 | 7/2009 | Geiselhart et al. |
| 7,920,944 B2 | 4/2011 | Gould |
| 8,024,084 B2 | 9/2011 | Breed |
| 8,068,104 B2 | 11/2011 | Rampersad |
| 8,131,420 B2 | 3/2012 | Lynch et al. |
| 8,200,389 B1 | 6/2012 | Thompson et al. |
| 8,224,765 B2 | 7/2012 | Khalak et al. |
| 8,229,624 B2 | 7/2012 | Breed |
| 8,229,900 B2 | 7/2012 | Houle |
| 8,285,438 B2 | 10/2012 | Mylaraswamy et al. |
| 8,311,858 B2 | 11/2012 | Everett et al. |
| 8,359,134 B2 | 1/2013 | Maesono |
| 8,374,745 B2 | 2/2013 | Zhang et al. |
| 8,452,481 B2 | 5/2013 | Ishiko et al. |
| 8,543,280 B2 | 9/2013 | Ghimire |
| 8,548,671 B2 | 10/2013 | Wong et al. |
| 8,626,385 B2 | 1/2014 | Humphrey |
| 8,676,631 B2 | 3/2014 | Basak |
| 2003/0095278 A1 | 5/2003 | Schwartz et al. |
| 2003/0137194 A1* | 7/2003 | White ..................... B60L 3/12 307/10.1 |
| 2005/0065678 A1 | 3/2005 | Smith |
| 2008/0036487 A1 | 2/2008 | Bradley |
| 2010/0198771 A1 | 8/2010 | Khalak |
| 2010/0332201 A1 | 12/2010 | Albarede et al. |
| 2011/0118905 A1 | 5/2011 | Mylaraswamy |
| 2013/0035822 A1 | 2/2013 | Singh et al. |
| 2014/0336869 A1 | 11/2014 | Bou-Ghannam et al. |

FOREIGN PATENT DOCUMENTS

| | | |
|---|---|---|
| EP | 1110096 B1 | 6/2011 |
| EP | 2730448 A1 | 5/2014 |
| JP | 06331504 A | 12/1994 |
| JP | 07028523 A | 1/1995 |
| JP | 2008052660 A | 3/2008 |

OTHER PUBLICATIONS ip.com, IBM, Wear-Leveling Technique for EEPROM devices, IPCOM000187712D, Sep. 2009.

Jardine et al. Optimizing a Mine Haul Truck Wheel Motors' Condition Monitoring Program: Use of Proportional Modeling, Case Study Report, Optimal Maintenance Decision Inc. 2001.

Tian et al. Condition Based Maintenance Optimization Considering Multiple Objectives, Journal of Intelligent 23, 2, 333-340. 2012.

J. Rust, Optimal Replacement of GMC Bus Engines: An Empirical Model of Harold Zurcher, Econometrica 55, 5, 999-1033. 1987.

Zhu et al. Intelligent Maintenance Support System for Syncrude Mining Trucks, 1993 Canadian Conference on Electrical and Computer Engineering, Vancouver, 1217-1220.

Lam et al. Optimal Maintenance—Policies for Deteriorating Systems under Various Maintenance Strategies, IEEE on Reliability 43, 3, 423-430. 1994.

Wu et al. A Neural Network Integrated Decision Support System for Condition-Based Optimal Predictive Maintenance IEEE Transactions on Systems, Man, and Cybernetics Part A: System and Humans, 37, 2, 226-236. 2007.

Murphy, Kevin P. Machine Learning: a Probabilistic Perspective, The MIT Press, 2012. Table of Contents. Year Year Year.

Wikipedia, Survival Analysis, Sep. 18, 2014, https://en.wikipedia.org/w/index.php? title=Survival_analysis&oldid=626053780.

Therneau, Terry. Extending the Cox Model, Technical Report No. 58, Nov. 1996.

Hastie et al. The Elements of Statistical Learning: Data Mining, Inference and Prediction, The Mathematical Intelligencer 27.2 (2005): 83-85.

Mannila et al. Discovery of Frequent Episodes in Event Sequences, Data Mining and Knowledge Discovery 1.3 (1997): 259-289.

Bair et al. Prediction by Supervised Principal Components, Journal of the American Statistical Association, 101(473). 2006.

Banjevic et al. A Control-Limit Policy and Software for Condition-Based Maintenance Optimization, Infor—Ottawa—, 39(1), 32-50. 2001.

Fox J. Cox Proportional—Hazards Regression for Survival Data, 2002.

Jardine et al. Repairable System Reliability: Recent Developments in CBM Optimization, International Journal of Performability Engineering, 4(3), 205. 2008.

Scholkopf et al. Learning with Kernels, MIT press Cambridge, 2002.

Wu et al. Optimal Replacement in the Proportional Hazards Model with Semi-Markovian Covariate Process and Continuous Monitoring, Reliability, IEEE Transactions on, 60(3),580-589. 2011.

Zaki, M.J. Spade, An Efficient Algorithm for Mining Frequent Sequences, Machine Learning, 42(1-2), 31-60.

Bachetti et al. Survival Trees with Time-Dependent Covariates: Application to Estimating Changes in the Incubation Period of AIDS, Lifetime Data Anal., vol. 1, No. 1, pp. 35-47, 1995.

Breiman et al. Classification and Regression Trees, 1st ed. Chapman and Hall/CRC, 1984.

Friedman et al. Additive Logistic Regression: a Statistical View of Boosting, (With Discussion and a Rejoinder by the Authors), Ann. Stat., vol. 28, No. 2, pp. 337-407, Apr. 2000.

Hothorn et al. Survival Ensembles, Biostat, vol. 7, No. 3, pp. 355-373, Jul. 2006.

Huang et al. Piecewise Exponential Survival Trees with Time-Dependent Covariates, Biometrics, vol. 54. No. 4, pp. 1420-1433, Dec. 1998.

Motorola Inc. et al. New Method and Apparatus for Device Failure Assessment, IPCOM000159857D, Oct. 2007.

IBM, Method of Component Failure Prediction in Large Server and Storage Systems, Jan. 13, IPCOM000191729D, 2010.

An et al. Fatigue Life Prediction Based on Bayesian Approach to Incorporate Field Data into Probability Model, Structural Engineering and Mechanics, vol. 37, No. 4, p. 427-442, 2011.

Jardine et al. A Review on Machinery Diagnostics and Prognostics Implementing Condition-Based Maintenance, in: Mechanical Systems and Signal Processing, 20, 2006, pp. 1483-1510.

Peng et al. Current Status of Machine Prognostics in Condition-Based Maintenance: a Review, in: International Journal of Advanced Manufacturing Technology, 50, 2010, pp. 297-313.

Lin et al. Filters and Parameter Estimation for a Partially Observable System Subject to Random Failure with Continuous-Range Observations, in: Advances in Applied Probability, 36(4), 2004, pp. 1212-1230.

(56) References Cited

OTHER PUBLICATIONS

Lin et al. On-Line Parameter Estimation for a Failure-Prone System Subject to Condition Monitoring, in: Journal of Applied Probability, 41(1), 2004, pp. 211-220.

S. Mussi, General Environment for Probabilistic Predictive Monitoring, International Journal of Computers vol. 7, No. 2, 31-49. 2013.

S. Mussi, Probabilistic Predictive Monitoring with CHEERUP, International Journal of Computers vol. 6, No. 1, 93-102. 2012.

Liao et al. Predictive Monitoring and Failure Prevention of Vehicle Electronic Components and Sensor Systems, SAE Technical Paper 2006-01-0373, 2006, doi:10.4271/2006-01-0373. 2006.

Jardine et al. Repairable System Reliability: Recent Developments in CBM Optimization, 19th International Congress and Exhibition on Condition Monitoring and Diagnostic Engineering Management (COMADEM). Lulea, Sweden, Jun. 2006.

Ataman et al. Knowledge Discovery in Mining Truck Databases, Proceedings. 17th International Mining Congress, The Chamber of Mining Engineers of Turkey, Ankara, 2001.

Hu et al. Early Detection of Mining Truck Failure by Modeling its Operation with Neural Networks Classification Algorithms, Application of Computers and Operations Research in the Minerals Industries, South African Institute of Mining and Metallurgy, 2003.

Ahmad et al. An Overview of Time-Based and Condition-Based Maintenance in Industrial Application, Computers and Industrial Engineering 63, 1, 135-149. 2012.

Jardine et al., "Optimal replacement policy and the structure of software for condition-based maintenance," Journal of Quality in Maintenance Engineering 3, 2, 109-119. 1997.

Jardine et al., Maintenance, replacement, and reliability: theory and applications. CRC Press LLC, 2013.

Zhang, An Introduction to Support Vector Machines and Other Kernel-Based Learning Methods—A Review. AI Magazine vol. 22 No. 2 (2001).

Singer et al., Applied longitudinal data analysis: Modeling change and event occurrence. http://gseacademic.harvard.edu/alda/. Jun. 1, 2005.

Lin et al., "Using principal components in a proportional hazards model with applications in condition-based maintenance," Journal of Operational Research Society 57, 910-919. 2006.

List of IBM Patents or Applications Treated as Related.

\* cited by examiner

GENERATING ESTIMATES OF FAILURE RISK FOR A VEHICULAR COMPONENT

FIELD OF THE INVENTION

Embodiments of the invention generally relate to information technology, and, more particularly, to vehicle monitoring and maintenance.

BACKGROUND

In condition-based monitoring, sensor readings are commonly used to determine the wear of vehicular components. Therefore, such readings often serve as predictors of wear related component failures. However, with respect to non-wear related component failures, such predictors are lacking.

Accordingly, a need exists for techniques for generating estimates of non-wear related failure risk for a vehicular component based on input sets of time series.

SUMMARY

In one aspect of the present invention, techniques for generating estimates of non-wear related failure risk for a vehicular component are provided. A first example computer-implemented method can include splitting an input time series pertaining to a vehicular component across a fleet of multiple vehicles into multiple sub-time series, wherein each of the multiple sub-time series comprises multiple data points of the input time series that correspond to one of multiple measurements derived from the vehicular component. Additionally, the method includes determining a weight applied to each of the multiple sub-time series based on a pre-determined weight associated with the input time series, wherein said determining comprises associating the pre-determined weight associated with the input time series with each of the multiple sub-time series; as well as applying one of two classification labels to each of the multiple sub-time series based on a relationship of the data points of the given sub-time series and a selected threshold value, wherein the classification labels comprise (i) associated with a failure of the vehicular component and (ii) not associated with a failure of the vehicular component. Further, the method also includes applying one of the two classification labels to the input time series to correspond to the label applied to a majority of the multiple sub-time series; and calculating a performance measure for the input time series based on (i) the weight applied to each of the multiple sub-time series, and (ii) a determination as to whether the correct classification label has been applied to each of the multiple sub-time series. The method additionally includes determining an updated weight associated with the input time series based on (i) the pre-determined weight associated with the input time series, (ii) the weight applied to each of the multiple sub-time series, and/or (iii) the performance measure; and generating an estimate of failure risk for the vehicular component based on (i) the classification label applied to each input time series and (ii) the updated weight associated with the input time series.

In another aspect of the invention, a second example computer-implemented method can include the steps of the first example method above, but wherein determining a weight applied to each of the multiple sub-time series comprises evenly distributing the pre-determined weight associated with the input time series across the multiple sub-time series.

In yet another aspect of the invention, a third example computer-implemented method can include the steps of the first example method above, but wherein determining a weight applied to each of the multiple sub-time series comprises distributing the pre-determined weight associated with the input time series to each of the multiple sub-time series inversely proportional to the length of each of the multiple sub-time series.

Additionally, in another aspect of the invention, a fourth example computer-implemented method can include the steps of the first example method above, but wherein determining a weight applied to each of the multiple sub-time series based on a pre-determined weight associated with the input time series comprises distributing the pre-determined weight associated with the input time series exclusively to the temporally last of the multiple sub-time series.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes generating estimates of failure risk (for example, non-wear related failure risk) for a vehicular component. At least one embodiment of the invention includes obtaining and/or receiving, as input, a set of original time series (TS), each of which represents a collection of sample data points, wherein each sample data point includes a combination of measurements derived from a given vehicular component.

Figure 1:
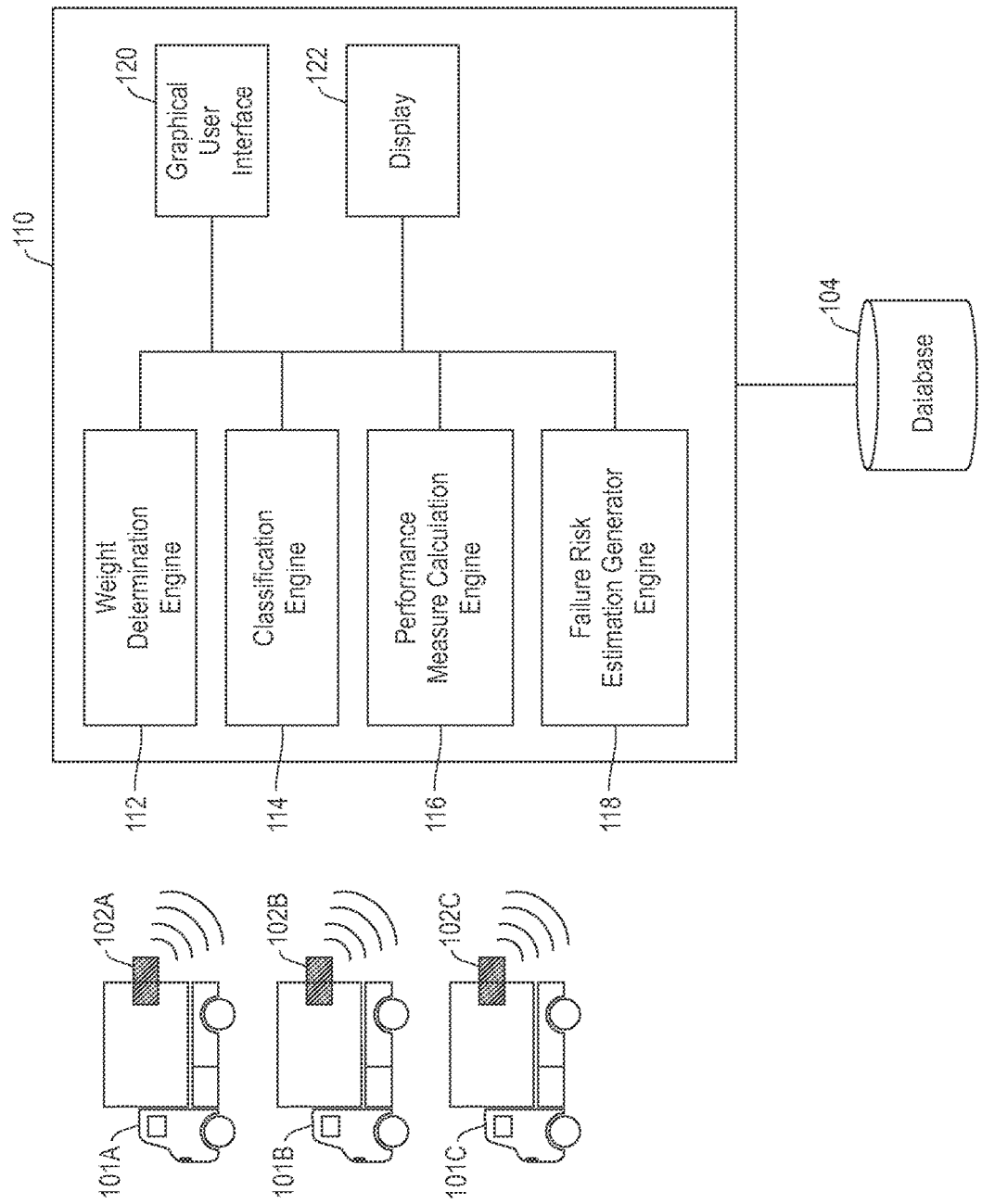
FIG. 1 is a diagram illustrating system architecture, according to an example embodiment of the invention.

FIG. 1 is a diagram illustrating system architecture, according to an example embodiment of the present invention. By way of illustration, FIG. 1 depicts a risk failure estimation system 110, which receives input from sensors 102A, 102B and 102C resident on and/or connected to vehicles 101A, 101B and 101C, respectively. By way merely of example, the input from sensors 102A, 102B and 102C can be transmitted wirelessly to the system 110 and/or can be transmitted to the system 110 via a direct electrical connection (for instance, via creating an electrical connection or interface between a given sensor and the system 110 upon detaching the sensor from a given vehicle).

As illustrated in FIG. 1, the system 110 includes a weight determination engine 112, a classification engine 114, a performance measure calculation engine 116, a failure risk estimation generator engine 118, a graphical user interface 120 and a display 122. As further detailed herein, engines 112, 114, 116 and 118 process multiple forms of data to generate a failure risk estimate (for example, a non-wear related failure risk estimate) for one or more given vehicular components based on the input provided by sensors 102A, 102B and 102C. As detailed herein, generated data, classifications and calculations can be stored by the system 110 in database 104. The generated failure risk estimate for the given vehicular components are transmitted to the graphical user interface 120 and the display 122 for presentation and/or potential manipulation by a user.

As further detailed herein, given a weight for each of the original time series in the input set, at least one embodiment of the invention includes determining the weight of a given sub-time series by one of multiple methods selected based on considerations of preventing failure and allowing an increased number false alarms. Such methods, as additionally described herein, include (i) associating the weight of an original time series with each of the sub-time series of that original time series, (ii) evenly distributing the weight of each original time series across the sub-time series of that time series, (iii) distributing the weight of each original time series across the sub-time series of that original time series via inverse proportionality, and (iv) distributing the weight of each original time series to the last sub-time series of that original time series.

Figure 2:
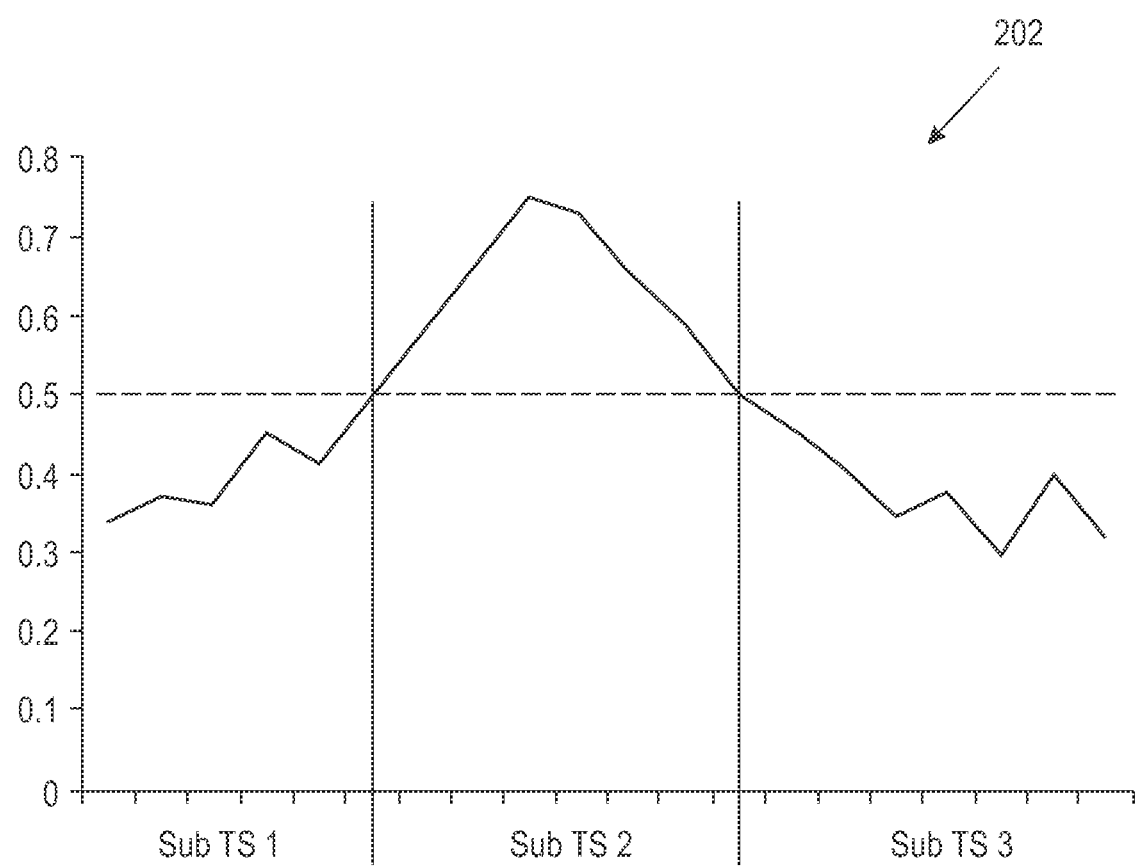
FIG. 2 is a diagram illustrating time series splitting, according to an example embodiment of the present invention.

As noted, at least one embodiment of the invention includes obtaining input that includes a combination and/or collection of measurements derived from a given vehicular component, wherein one of the measurements indicates whether the given vehicular component failed or not. Accordingly, for all obtained and/or collected measurements, at least one embodiment of the invention includes selecting a particular value, and splitting, in connection with each selected value, each original time series into multiple sub-time series. The splitting occurs at each point wherein the measurement of the original time series crosses the selected value, such as illustrated in FIG. 2, which depicts a graph 202 illustrating time series splitting. In the example graph 202 in FIG. 2, the y-axis represents values of a collected measurement, wherein 0.5 has been selected as the value for splitting purposes.

Accordingly, and as noted above, given a weight for each original time series, the weight of each corresponding sub-time series (such as the three sub-time series illustrated in the FIG. 2 graph) is determined via one of multiple alternative methods. In accordance with one or more embodiments of the invention, the particular method can be selected by a given user (for example, based on user preference between preventing a failure and limiting the number of false failure predictions).

As detailed above, the noted methods can include (i) associating the weight of an original time series with each of the sub-time series of that original time series (and subsequently, for example, divide each new weight by the total of all new weights), (ii) evenly distributing the weight of each original time series across the sub-time series of that original time series, (iii) distributing the weight of each original time series across the sub-time series of that original time series via inverse proportionality (for example, such that the distribution is inversely proportional to the length of each sub-time series), and (iv) distributing the weight of each original time series to the last sub-time series of that original time series.

By way of example, a user might select method (iv) if the user has a higher preference for limiting failure, and a user might select method (i) if the user has a higher preference for limiting false failure predictions.

Referring again to FIG. 2 and the aspect of time series splitting, at least one embodiment of the invention includes selecting values and splitting, in connection with each selected value, each original time series into multiple sub-time series. Additionally, for each selected value, a discrimination score (for example, a log rank statistics) can be calculated and the value with the highest discrimination score can be chosen, together with the sub-time series corresponding to the chosen value. Also, in at least one embodiment of the invention, a node is created with a left leaf that contains all sub-time series with measurements above the selected value, and a right leaf that contains the sub-time series with measurements below or equal to the selected value, such as depicted in FIG. 3.

Figure 3:
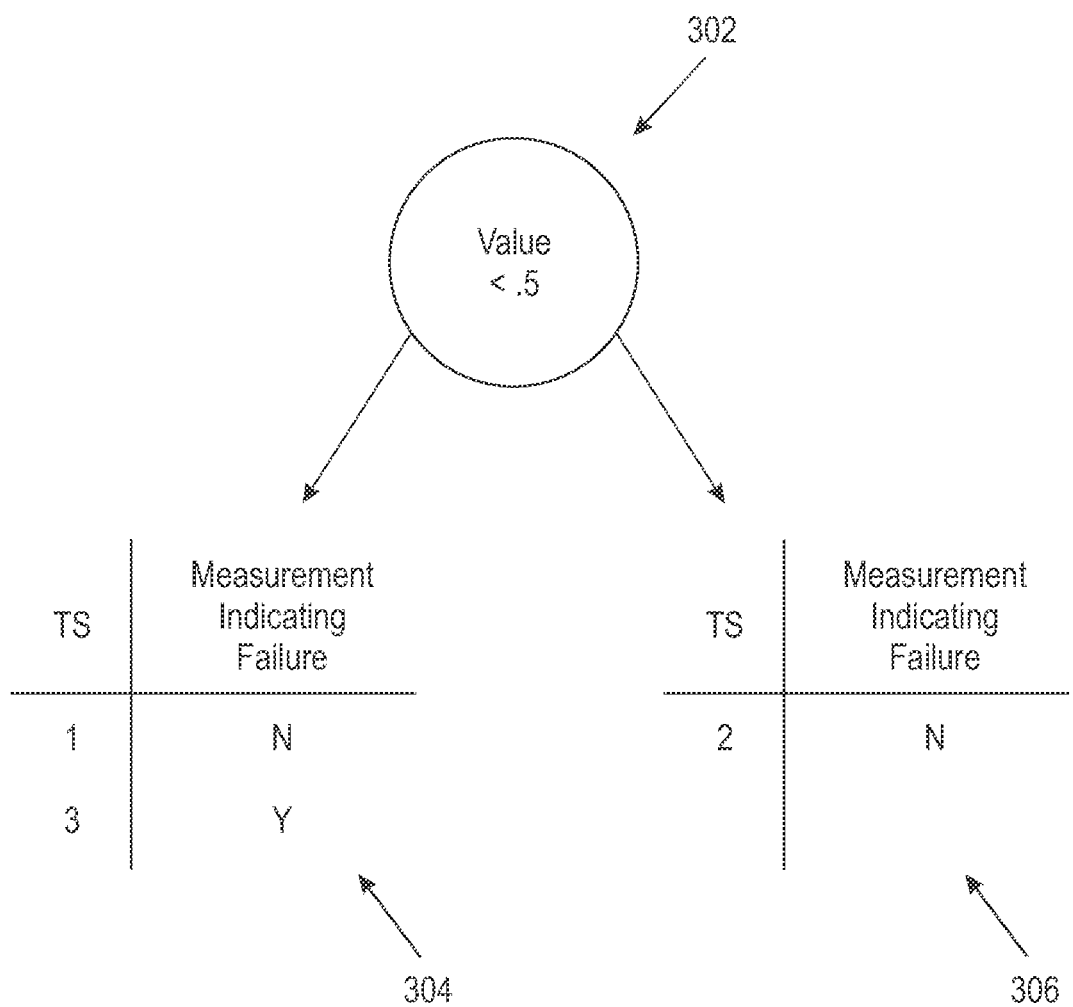
FIG. 3 is a diagram illustrating left leaf and right leaf specifications, according to an example embodiment of the present invention.

Accordingly, FIG. 3 is a diagram illustrating left leaf and right leaf specifications, according to an example embodiment of the present invention. By way of illustration, FIG. 3 depicts a selected value 302, a left leaf 304 (which includes sub-time series (STS) 1 and sub-time series (STS) 3) and a right leaf 306 (which includes sub-time series (STS) 2).

If the right leaf 306 or the left leaf 304 contain a sub-time series with measurements that indicate a failure and a sub-time series with no measurements that indicate a failure, the above-noted procedures (in connection with FIG. 3) are repeated with all sub-time series of that leaf now representing the original time series. Additionally, when a new node is created, the splitting criteria (that is, the measurement and the selected value) are stored in a database. Further, a class label is also stored for each leaf, wherein the class label represents a failure if the majority of the sub-time series in that leaf contain measurements indicating a failure, or a non-failure otherwise.

If no additional nodes are created, at least one embodiment of the invention includes splitting all of the original time series into two non-overlapping sets: one larger set of original time series and one smaller set of original time series. Such an embodiment subsequently performs the above-detailed steps detailed in connection with FIG. 3 only for the larger set of the original time series and enters a loop over all nodes, starting from the bottom.

In an example iteration, the selected node is deleted and the remaining nodes are used for determining for each of the original time series contained in the small set of original time series if the selected node contains a measurement that indicates a failure. In at least one embodiment of the invention, this determination is carried out via the following procedure. Starting at the top node, a given time series from the small set of original time series is split into sub-time series (such as depicted, for example, in FIG. 2). Each such sub-time series is then assigned either to the left leaf or the right leaf (such as detailed in FIG. 3, for example). After proceeding through all nodes, each sub-time series is given the class label of its corresponding leaf. Further, a classification error score is calculated based on the number of sub-time series that are given the wrong class label, multiplied by the weight associated with each such sub-time series.

After proceeding through all nodes and classifying the smaller set of original time series, the one or more nodes with the lowest classification error are selected. Starting from the bottom, individual nodes are deleted until the total number of nodes equals the number of nodes selected with the lowest classification error. A classification error (e) for the complete set of original time series is then calculated in the same manner as for the small set of original time series (as detailed above). Additionally, a performance measure (p) for the complete set of original time series is calculated via $p = \log((1-e)/e)$.

The weight (w) of each original input time series is then set in accordance with the particular sub-time series weight determination method (such as described above) that was utilized. For instance, if method (i) (that is, evenly distributing the weight of each original time series across the sub-time series of that original time series) was used:

$$w = \begin{cases} w * \exp(p), \text{ if any of sub } TS \text{ is classified wrongly} \\ \text{weight otherwise} \end{cases}$$

If method (ii) (that is, evenly distributing the weight of each original time series across the sub-time series of that time series) or method (iii) (that is, distributing the weight of each original time series across the sub-time series of that original time series via inverse proportionality) was used:

$$w = \sum_{all\ sub\ TS} \begin{cases} \text{assigned weight to the sub } TS * \exp(p), \\ \text{if the sub } TS \text{ is classified wrongly} \\ \text{assigned weights to the sub } TS, \text{ otherwise} \end{cases}$$

Further, if method (iv) (that is, distributing the weight of each original time series to the last sub-time series of that original time series) was used:

$$w = \begin{cases} w * \exp(p), \text{ if any of sub } TS \text{ is classified wrongly} \\ \text{weight, otherwise} \end{cases}$$

In at least one embodiment of the invention, the weight determining steps are iterated to a pre-specified condition, and in each iteration, the classifier as well as the performance are stored in a database.

Given a new time series, an example embodiment of the invention includes generating estimates for non-wear related failure risks for a given vehicular component by applying relevant classifiers (in the same manner as described for the small set of original time series) to the new time series, wherein the classification results are weighted by the corresponding performance measures of the relevant classifiers.

Figure 4:
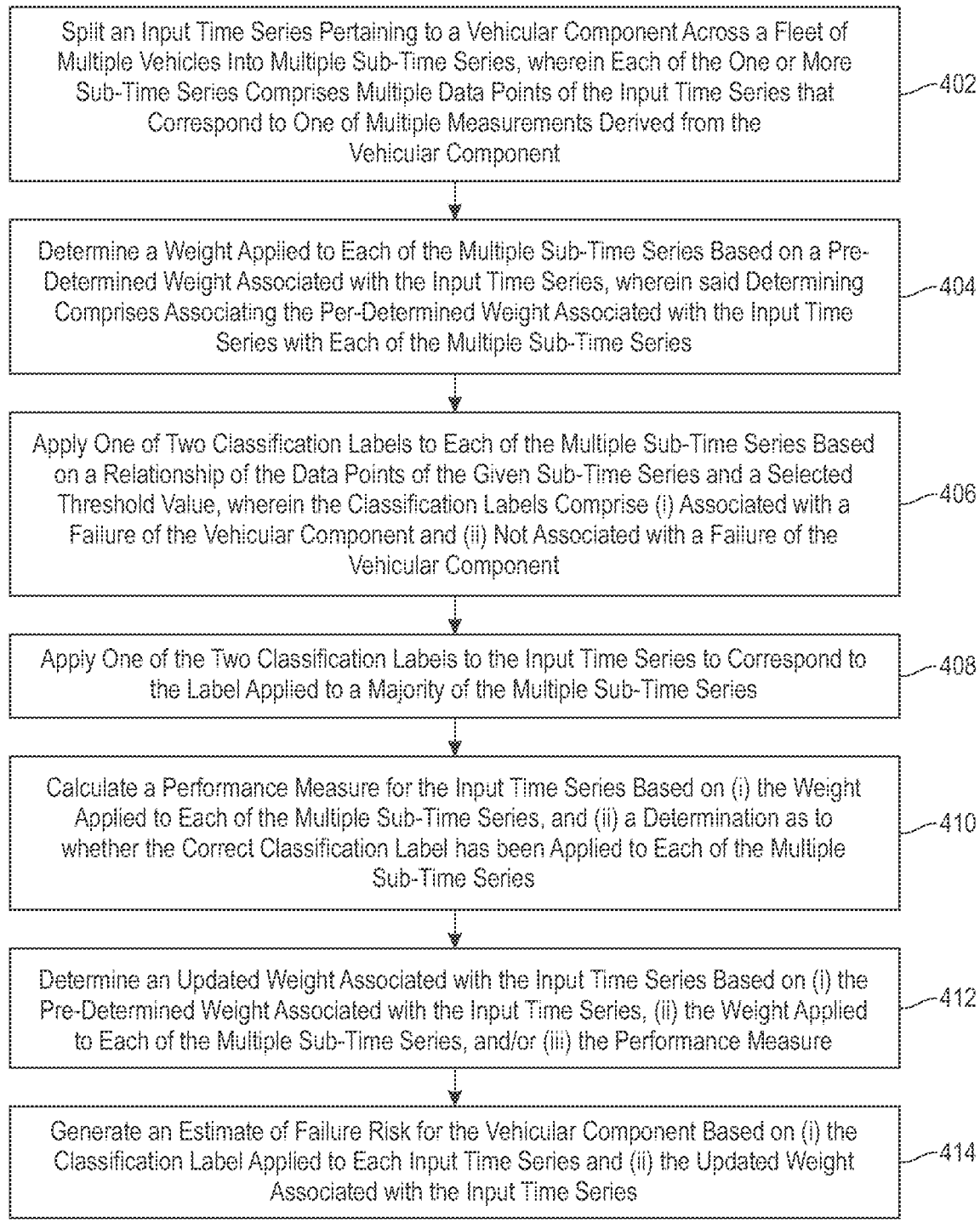
FIG. 4 is a flow diagram illustrating techniques according to an embodiment of the invention.

FIG. 4 is a flow diagram illustrating techniques according to an embodiment of the present invention. Step 402 includes splitting an input time series pertaining to a vehicular component across a fleet of multiple vehicles into multiple sub-time series, wherein each of the multiple sub-time series comprises multiple data points of the input time series that correspond to one of multiple measurements derived from the vehicular component. Step 404 includes determining a weight applied to each of the multiple sub-time series based on a pre-determined weight associated with the input time series, wherein said determining comprises associating the pre-determined weight associated with the input time series with each of the multiple sub-time series. The pre-determined weight can include, for example, a uniform weight for all input time series pertaining to the vehicular component.

Step 406 includes applying one of two classification labels to each of the multiple sub-time series based on a relationship of the data points of the given sub-time series and a selected threshold value, wherein the classification labels comprise (i) associated with a failure of the vehicular component and (ii) not associated with a failure of the vehicular component. Step 408 includes applying one of the two classification labels to the input time series to correspond to the label applied to a majority of the multiple sub-time series.

Step 410 includes calculating a performance measure for the input time series based on (i) the weight applied to each of the multiple sub-time series, and (ii) a determination as to whether the correct classification label has been applied to each of the multiple sub-time series. This determination can be based, for example, on whether the corresponding vehicular component experience a failure. Step 412 includes determining an updated weight associated with the input time series based on (i) the pre-determined weight associated with the input time series, (ii) the weight applied to each of the multiple sub-time series, and/or (iii) the performance measure. Determining an updated weight associated with the input time series can include calculating $w*\exp(p)$, if any of the one or more sub-time series is classified incorrectly, and reusing the pre-determined weight otherwise, wherein (w) represents the pre-determined weight and (p) represents the performance measure.

Step 414 includes generating an estimate of failure risk for the vehicular component based on (i) the classification label applied to each input time series and (ii) the updated weight associated with the input time series. Generating the estimate of failure risk can include, for example, calculating an average estimate of failure risk value based on (1) the classification label applied to each input time series and (2) the updated weight associated with input time series.

The techniques depicted in FIG. 4 can also include obtaining the input time series pertaining to the vehicular component across the fleet of multiple vehicles, wherein the input time series includes multiple data points, and wherein the multiple data points comprise a collection of multiple measurements derived from the vehicular component across the fleet of multiple vehicles. Additionally, the techniques depicted in FIG. 4 can include repeating all of the steps noted in FIG. 4 for a given number of additional input time series pertaining to the vehicular component.

Also, at least one embodiment of the invention can include the steps detailed in FIG. 4, but wherein determining a weight applied to each of the multiple sub-time series includes evenly distributing the pre-determined weight associated with the input time series across the multiple sub-time series. Further, in such an embodiment, determining an updated weight (w) associated with the input time series includes calculating:

$$w = \sum_{all\ sub-time\ series} \begin{cases} \text{assigned weight to the sub-time series} * \exp(p), \\ \text{if the given sub-time series is classified wrongly} \end{cases}$$

and $$w = \sum_{\text{all sub-time series}} \begin{cases} \text{assigned weight to the sub-time series,} \\ \text{otherwise} \end{cases},$$

wherein (p) represents the performance measure.

Additionally, at least one embodiment of the invention can include the steps detailed in FIG. 4, but wherein determining a weight applied to each of the multiple sub-time series based on a pre-determined weight associated with the input time series includes distributing the pre-determined weight associated with the input time series to each of the multiple sub-time series inversely proportional to the length of each of the multiple sub-time series. Further, in such an embodiment, determining an updated weight (w) associated with the input time series includes calculating:

$$w = \sum_{\text{all sub-time series}} \begin{cases} \text{assigned weight to a given} \\ \text{sub-time series} * \exp(p), \\ \text{if the given sub-time series} \\ \text{is classified wrongly} \end{cases}$$

and $$w = \sum_{\text{all sub-time series}} \begin{cases} \text{assigned weights to the given sub-time series,} \\ \text{otherwise} \end{cases},$$

wherein (p) represents the performance measure.

One or more embodiments of the invention, additionally, can include the steps detailed in FIG. 4, but wherein determining a weight applied to each of the multiple sub-time series based on a pre-determined weight associated with the input time series includes distributing the pre-determined weight associated with the input time series exclusively to the temporally last of the multiple sub-time series. Further, in such an embodiment, determining an updated weight associated with the input time series includes calculating w*exp(p), if the last of the multiple sub-time series is classified incorrectly, and reusing the pre-determined weight otherwise, wherein (w) represents the pre-determined weight and (p) represents the performance measure.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 5:
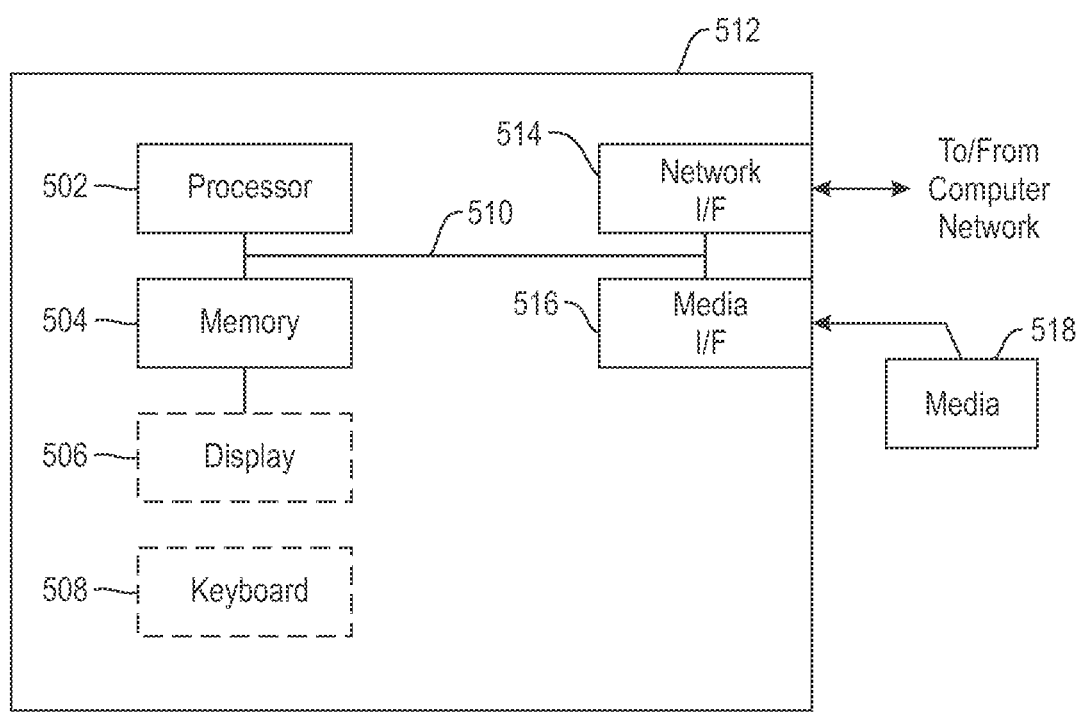
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like)

can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, generating estimates of failure risk for a vehicular component based on a set of time series derived from a given vehicular component.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

splitting an input time series pertaining to a vehicular component across a fleet of multiple vehicles into multiple sub-time series, wherein each of the multiple sub-time series comprises multiple data points of the input time series that correspond to one of multiple measurements derived from the vehicular component;

determining a weight applied to each of the multiple sub-time series based on a pre-determined weight associated with the input time series, wherein said determining comprises associating the pre-determined weight associated with the input time series with each of the multiple sub-time series;

applying one of two classification labels to each of the multiple sub-time series based on a relationship of the data points of the given sub-time series and a selected threshold value, wherein the classification labels comprise (i) associated with a failure of the vehicular component and (ii) not associated with a failure of the vehicular component;

applying one of the two classification labels to the input time series to correspond to the label applied to a majority of the multiple sub-time series;

calculating a performance measure for the input time series based on (i) the weight applied to each of the multiple sub-time series, and (ii) a determination as to whether the correct classification label has been applied to each of the multiple sub-time series;

determining an updated weight associated with the input time series based on (i) the pre-determined weight associated with the input time series, (ii) the weight applied to each of the multiple sub-time series, and/or (iii) the performance measure, wherein said determining the updated weight associated with the input time series comprises calculating w*exp(p), if any of the one or more sub-time series is classified incorrectly, and reusing the pre-determined weight otherwise, wherein (w) represents the pre-determined weight and (p) represents the performance measure;

generating an estimate of failure risk for the vehicular component based on (i) the classification label applied to each input time series and (ii) the updated weight associated with the input time series; and replacing the vehicular component in each of the multiple vehicles based at least in part on the estimate of failure risk for the vehicular component;

wherein the method is carried out by at least one computing device.

2. The method of claim 1, comprising:

obtaining the input time series pertaining to the vehicular component across the fleet of multiple vehicles, wherein the input time series comprises multiple data points, and wherein the multiple data points comprise a collection of multiple measurements derived from the vehicular component across the fleet of multiple vehicles.

3. The method of claim 1, comprising:

repeating all of said steps for a given number of additional input time series pertaining to the vehicular component.

4. The method of claim 1, wherein said pre-determined weight comprises a uniform weight for all input time series pertaining to the vehicular component.

5. A computer program product, the computer program product comprising a non-transitory computer readable storage medium having program instructions embodied therewith, the program instructions executable by a computing device to cause the computing device to carry out the steps of claim 1.

6. A system comprising a memory, and at least one processor coupled to the memory and configured for carrying out the steps of claim 1.

7. A method comprising:
splitting an input time series pertaining to a vehicular component across a fleet of multiple vehicles into multiple sub-time series, wherein each of the multiple sub-time series comprises multiple data points of the input time series that correspond to one of multiple measurements derived from the vehicular component;
determining a weight applied to each of the multiple sub-time series based on a pre-determined weight associated with the input time series, wherein said determining comprises evenly distributing the pre-determined weight associated with the input time series across the multiple sub-time series;
applying one of two classification labels to each of the multiple sub-time series based on a relationship of the data points of the given sub-time series and a selected threshold value, wherein the classification labels comprise (i) associated with a failure of the vehicular component and (ii) not associated with a failure of the vehicular component;
applying one of the two classification labels to the input time series to correspond to the label applied to a majority of the multiple sub-time series;
calculating a performance measure for the input time series based on (i) the weight applied to each of the multiple sub-time series, and (ii) a determination as to whether the correct classification label has been applied to each of the multiple sub-time series;
determining an updated weight associated with the input time series based on (i) the pre-determined weight associated with the input time series, (ii) the weight applied to each of the multiple sub-time series, and/or (iii) the performance measure, wherein said determining the updated weight (w) associated with the input time series comprises calculating:

$$w = \sum_{\text{all sub-time series}} \begin{cases} \text{assigned weight to a given} \\ \text{sub-time series} * \exp(p), \\ \text{if the given sub-time series} \\ \text{is classified wrongly} \end{cases}$$

and $$w = \sum_{\text{all sub-time series}} \begin{cases} \text{assigned weights to the given sub-time series,} \\ \text{otherwise} \end{cases},$$

wherein (p) represents the performance measure;
generating an estimate of failure risk for the vehicular component based on (i) the classification label applied to each input time series and (ii) the updated weight associated with the input time series; and
replacing the vehicular component in each of the multiple vehicles based at least in part on the estimate of failure risk for the vehicular component;
wherein the method is carried out by at least one computing device.

8. The method of claim 7, wherein said pre-determined weight comprises a uniform weight for all input time series pertaining to the vehicular component.

9. A computer program product, the computer program product comprising a non-transitory computer readable storage medium having program instructions embodied therewith, the program instructions executable by a computing device to cause the computing device to carry out the steps of claim 7.

10. A system comprising a memory, and at least one processor coupled to the memory and configured for carrying out the steps of claim 7.

11. A method comprising:
splitting an input time series pertaining to a vehicular component across a fleet of multiple vehicles into multiple sub-time series, wherein each of the multiple sub-time series comprises multiple data points of the input time series that correspond to one of multiple measurements derived from the vehicular component;
determining a weight applied to each of the multiple sub-time series based on a pre-determined weight associated with the input time series, wherein said determining comprises distributing the pre-determined weight associated with the input time series to each of the multiple sub-time series inversely proportional to the length of each of the multiple sub-time series;
applying one of two classification labels to each of the multiple sub-time series based on a relationship of the data points of the given sub-time series and a selected threshold value, wherein the classification labels comprise (i) associated with a failure of the vehicular component and (ii) not associated with a failure of the vehicular component;
applying one of the two classification labels to the input time series to correspond to the label applied to a majority of the multiple sub-time series;
calculating a performance measure for the input time series based on (i) the weight applied to each of the multiple sub-time series, and (ii) a determination as to whether the correct classification label has been applied to each of the multiple sub-time series;
determining an updated weight associated with the input time series based on (i) the pre-determined weight associated with the input time series, (ii) the weight applied to each of the multiple sub-time series, and/or (iii) the performance measure, wherein said determining the updated weight (w) associated with the input time series comprises calculating:

$$w = \sum_{\text{all sub-time series}} \begin{cases} \text{assigned weight to a given} \\ \text{sub-time series} * \exp(p), \\ \text{if the given sub-time series} \\ \text{is classified wrongly} \end{cases}$$

and $$w = \sum_{\text{all sub-time series}} \begin{cases} \text{assigned weights to the given sub-time series,} \\ \text{otherwise} \end{cases},$$

wherein (p) represents the performance measure;
generating an estimate of failure risk for the vehicular component based on (i) the classification label applied to each input time series and (ii) the updated weight associated with the input time series; and
replacing the vehicular component in each of the multiple vehicles based at least in part on the estimate of failure risk for the vehicular component;
wherein the method is carried out by at least one computing device.

12. The method of claim 11, wherein said pre-determined weight comprises a uniform weight for all input time series pertaining to the vehicular component.

13. A computer program product, the computer program product comprising a non-transitory computer readable storage medium having program instructions embodied therewith, the program instructions executable by a computing device to cause the computing device to carry out the steps of claim 11.

14. A system comprising a memory, and at least one processor coupled to the memory and configured for carrying out the steps of claim 11.

15. A method comprising:
splitting an input time series pertaining to a vehicular component across a fleet of multiple vehicles into multiple sub-time series, wherein each of the multiple sub-time series comprises multiple data points of the input time series that correspond to one of multiple measurements derived from the vehicular component;
determining a weight applied to each of the multiple sub-time series based on a pre-determined weight associated with the input time series, wherein said determining comprises distributing the pre-determined weight associated with the input time series exclusively to the temporally last of the multiple sub-time series;
applying one of two classification labels to each of the multiple sub-time series based on a relationship of the data points of the given sub-time series and a selected threshold value, wherein the classification labels comprise (i) associated with a failure of the vehicular component and (ii) not associated with a failure of the vehicular component;
applying one of the two classification labels to the input time series to correspond to the label applied to a majority of the multiple sub-time series;
calculating a performance measure for the input time series based on (i) the weight applied to each of the multiple sub-time series, and (ii) a determination as to whether the correct classification label has been applied to each of the multiple sub-time series;
determining an updated weight associated with the input time series based on (i) the pre-determined weight associated with the input time series, (ii) the weight applied to each of the multiple sub-time series, and/or (iii) the performance measure, wherein said determining the updated weight associated with the input time series comprises: calculating w*exp(p), if the last of the multiple sub-time series is classified incorrectly and reusing the pre-determined weight otherwise, wherein (w) represents the pre-determined weight and (p) represents the performance measure;
generating an estimate of failure risk for the vehicular component based on (i) the classification label applied to each input time series and (ii) the updated weight associated with the input time series; and
replacing the vehicular component in each of the multiple vehicles based at least in part on the estimate of failure risk for the vehicular component;
wherein the method is carried out by at least one computing device.

16. The method of claim 15, wherein said pre-determined weight comprises a uniform weight for all input time series pertaining to the vehicular component.

17. A computer program product, the computer program product comprising a non-transitory computer readable storage medium having program instructions embodied therewith, the program instructions executable by a computing device to cause the computing device to carry out the steps of claim 15.

18. A system comprising a memory, and at least one processor coupled to the memory and configured for carrying out the steps of claim 15.

* * * * *